Oct. 28, 1969 C. W. SCHWENN 3,474,521

BONDING METHOD

Filed April 26, 1967

INVENTOR
CARL W. SCHWENN

BY Joseph L. Spiegel
ATTORNEY

United States Patent Office 3,474,521
Patented Oct. 28, 1969

3,474,521

BONDING METHOD

Carl W. Schwenn, Essex Junction, Vt., assignor to International Business Machines Corporation, Armonk, N.Y., a corporation of New York Filed Apr. 26, 1967, Ser. No. 634,289
Int. Cl. B23k, *31/02, 35/12*
U.S. Cl. 29—471.3 2 Claims

ABSTRACT OF THE DISCLOSURE

Two rows of terminal pins projecting from an adapter plug are soldered simultaneously to a like number of solder-coated strips on both faces of a printed circuit board.

Clamping and carriage assemblies fixedly position one row of terminal pins opposite the strips on a respective face of the board. Heater blades are positioned opposite each face, bring the pins and strips together and melt the solder. Forming blades positioned opposite each row of pins stress the pins against the strip while the solder is still molten, simultaneously registering each pin with its respective strip.

BACKGROUND OF INVENTION

The present invention relates to bonding and, in particular, to a process and apparatus for soldering simultaneously the terminal pins of an adapter plug to pretinned strips on both faces of a printed circuit board.

The present direction of developments in electrical and electronic packaging is toward the use of extremely small components in a very closely spaced arrangement providing total units of high component density.

Electrical connections in such units pose a difficult problem, mainly because of the relatively small size of the connections, the large number of connection to be made, and the close spacing between the connections. For example, one dielectric card in particular requires bonding adapter plug terminal pins to 139 strips, 0.056" wide, spaced 0.069" apart along one edge of the front face of the card, and a like number to be made to similarly sized and spaced strips along the same edge on the rear face of the card. It is clear that making these connections manually by the use of conventional soldering devices would not be feasible.

Accordingly, one object of the present invention is simultaneous bonding of adapter plug terminal pins to strips on both sides of a dielectric card.

Another object is accurate alignment of the parts to be soldered during the soldering operation.

Still another object is vertical soldering resulting in similar joint characteristics on both side of a card.

SUMMARY OF THE INVENTION

These and other objects are accomplished in accordance with the present invention, an illustrative embodiment of which includes a board clamping assembly for holding a printed circuit board firmly in a vertical plane and allowing access to solder coated strips on both faces of the board. An adapter plug having two rows of spaced terminal pins is fixedly held relative to the board by means of a carriage assembly such that the board is located in between the rows of pins, with each pin being disposed adjacent an associated strip. A pair of heater blades, one positioned opposite each face of the card, brings surfaces of the pins and strips together, at the same time melting the solder. With the heater blades in working position and while the solder is still molten, a pair of forming blades, one positioned opposite each row of pins, advances inwardly against the pins, stressing them inwardly against the board. Since the heater blades are not holding the surfaces of the pins fixedly against the strips, the pin surfaces are free to slide upwardly slightly while being stressed against the strips. Also, with the advancement of the forming blades, the pins are received within grooves in the forming blades, to insure proper registration of the pins with their respective strips when stressed against the board. With the forming blades still in working position, the heater blades are retracted allowing the solder to solidify with the pins still being held against the strips by the forming blades.

BRIEF DESCRIPTION OF THE DRAWING

The foregoing and other objects, features and advantages of the present invention will be apparent from the following more particular description of the present invention and accompanying drawing wherein.

DESCRIPTION OF THE PREFERRED EMBODIMENTS

Figure 1:
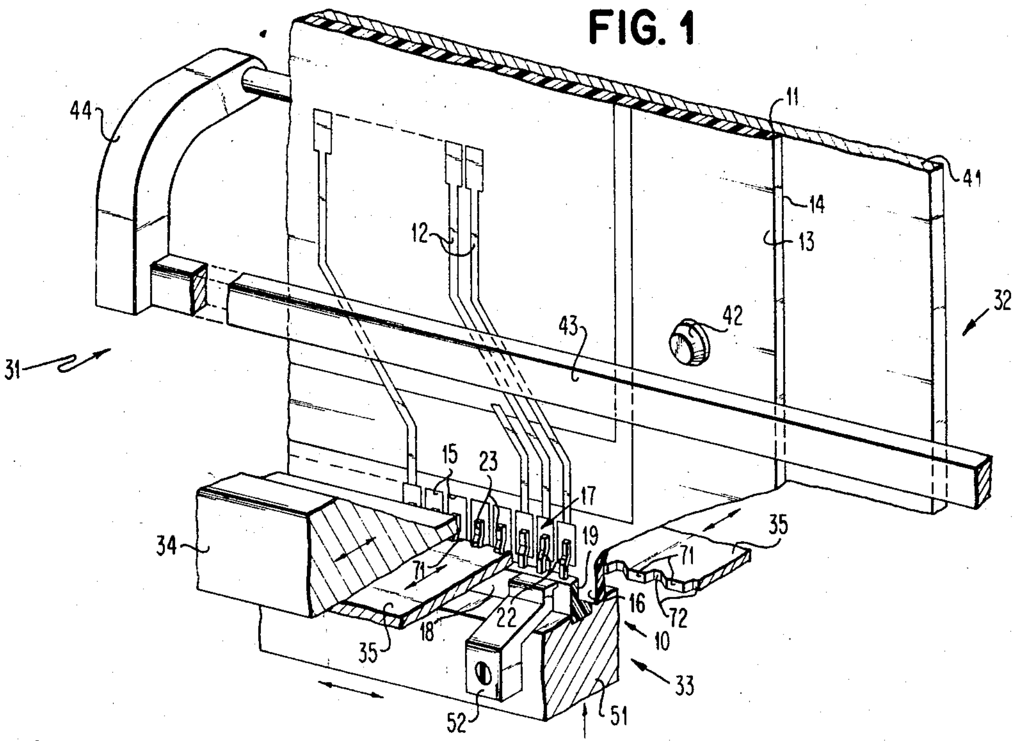
FIGURE 1 is a fragmentary perspective view of the apparatus of the present invention.

Referring now to the drawing, FIGURE 1 illustrates a preferred embodiment of the present invention. The apparatus shown is designed for joining the adapter plug 10 to a dielectric card 11.

The dielectric card 11 is typically a printed circuit board made of such materials as epoxy glass laminate, etc., 0.046 inch thick having a plurality of conductive lines 12, typically 0.0013 inch thick and 0.032 inch wide printed on both faces, i.e., the front 13 and back 14 of the board 11. Certain of the lines 12 terminate at parallel strips 0.056 inch wide and 0.0013 inch thick near the edges of the board, for example, the strips 15 near the bottom edge 16. The strips are pretinned, i.e., coated with solder, for subsequent joining operations.

It is necessary to connect the strips 15 to external circuitry. In order to do so, adapter plugs 10 are frequently employed. The particular plug illustrated has two rows of spaced terminal pins 17 projecting outwardly of a plastic body 18. The body 18 is provided with a vertical rectangular shaped slot 19 for positioning the bottom edge 16 of the board therein, thereby locating the board in-between the rows of contact pins 17.

The adapter terminal pins are typically of nickel 0.028 inch in diameter. Each pin includes a lower gold plated part 20 used for plugging into a mother card (not shown), an intermediate part 21 embedded in the plastic body and an upwardly projecting part including a lower portion 22 bent slightly inwardly and an upper straight portion 23 having an inner contact surface 24 to be subsequently joined to a strip 15 on the board 11. Normally, this inner surface 24 is coated with a lead/tin solder. No portion of the upwardly projecting part need be bent inwardly. The entire pin can be straight.

It is a primary purpose of this invention to bond simultaneosuly the adapter plug pins 17 to the strips 15 on both sides of the printed circuit board. Briefly, the apparatus 31 of the present invention includes: a board clamping assembly 32; an adapter plug carriage assembly 33; a pair of heater blades 34, one positioned opposite each face of the board for bringing the pins and strips together and melting the solder; and a pair of forming blades 35, one positioned opposite each row of pins for stressing the surfaces 24 of the pins against the strips 15 while the solder is still molten, simultaneously registering the pins with their respective strips.

The board 11 is held in a vertical position by a clamping assembly 32 that includes a mounting plate 41 against which the board will come to rest during soldering, locating pins 42 for accurately positioning the boards on the plate, and a clamping bar 43 pivotally supported by a pair of arms 44 for holding the board 11 firmly against the plate 41 during subsequent processing.

The mounting plate 41 is shorter than the board 11 to allow access to both faces of the board in the region where the board is to be soldered. The plate 41 is also relieved, where necessary, to allow for preassembly of components, modules and the like on the board.

The clamp bar 43 is faced with a thin layer of flexible material (not shown), for example, silicone rubber, for efficient clamping action. The clamp bar contacts the board along its length as low as possible, slightly above the solder coated strips.

The adapter plug carriage assembly 33 is a slide mounted unit having a nest 51 for the adapter plugs 10. The locating nest is a long bar with holes (not shown) for reception of the lower parts 20 of the adapter plug terminal pins 17. Pairs of latch fingers 52 clamp the adapter plugs down against the rest. A finger operating mechanism (not shown) operates on the fingers 52 to clamp the plugs firmly on the nest. A slide mechanism (not shown) slides the nest beneath the board. A carriage lift (not shown) lifts the carriage assembly, typically ⅜ of an inch, for proper pin registration relative to the strips and for proper adapter plug-to-board position.

Two heater blades 34 operate in a horizontal plane, one in front and one in back of the board. Each blade comprises a heated steel bar contoured to a long narrow tip 61. The heater blades are advanced from both sides towards the board for bringing the pins and strips together and melting the solder.

A pair of forming blades 35 which operate in a horizontal plane beneath the heater blades 34 are positioned opposite each row of pins. Each blade comprises a flat steel bar having a narrow tip 71. Additionally, the tip is provided with registration grooves 72. The forming blades are advanced inwardly against the lower portion 22 of the upwardly projecting part of the terminal pins to stress the surfaces of the pins against the strips. Upon engagement by the blades 35, the portions 22 are received within the grooves 72 which act to register each terminal pin 17 with its respective strip 15.

Standard power packages, for example, hydraulic cylinders, are used to power all machine motions. Such packages are considered to be conventional in the prior art and the particular type used forms no part of the present invention. Accordingly, their description and illustration have been deleted for the sake of brevity and clarity.

In operation, a worker vertically positions a board 11 by mounting it on the locating pins 42 of the plate 41. The clamping bar arms 44 are pivoted to bring the bar 43 onto the board 11 to hold it firmly against the plate 41 during subsequent processing.

Figure 2A:
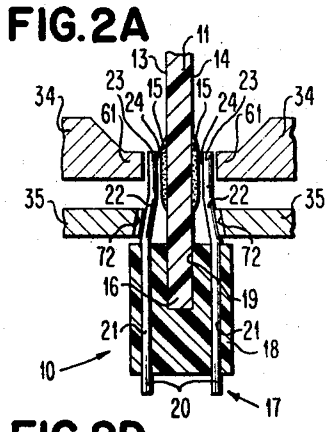
FIGURES 2A–2E are enlarged, progressive side views of the terminal pins of an adapter plug being bonded to conductive strips on a printed circuit board using the apparatus and process of the present invention.

The board adapter plugs 10 are clamped within the nest 51 and brought into assembly position. In assembly position (FIG. 2A), the bottom of the board 11 rests within the adapter plug slot 19 between the adapter terminal pins 17 such that the pins are positioned directly adjacent to their respective solder coated strips 15.

Figure 2B:
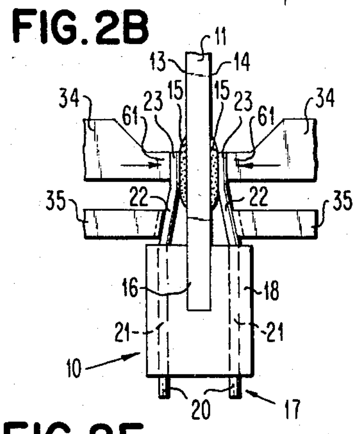

The heater blades are advanced from both sides to press the surfaces 24 of the pins 17 against the strips 15 and reflow the solder on same (FIG. 2B).

Figure 2C:
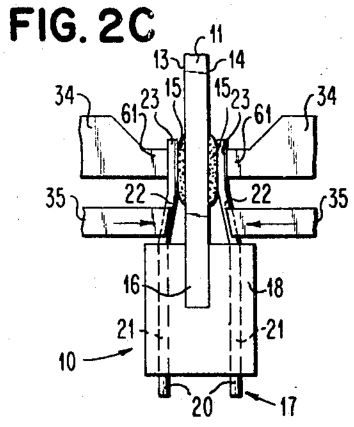

With the heater blades 34 in working position and the solder still molten, the forming blades 35 are advanced against the pins 17, stressing them inwardly towards the board (FIG. 2C). Since the heater blades 34 are not holding the surfaces 24 of the pins fixedly against the strips 15, merely pinching them against same, the surfaces 11 are free to move upwardly slightly. That is to say, the slight upward vertical movement of the pin 17, when the forming blade applies a new moment of bend, permits the surfaces 24 to seat against the strips 15. Also, with the advancement of the forming blades, the pins 17 are received within the forming blade grooves 72. This insures proper registration of the pins with their respective strips when stressed against the board.

When effecting a solder reflow joint, it is clear that excessive amounts of heat can easily and quickly damage the board, the strips and the printed lines. Simultaneous bonding of the pins to the strips on both faces of the board has the advantage that the one face of the board does not act as a heat dissipating sink during joining to the opposite face. Thus, power and heat requirements are lower, reducing the likelihood of damage to the board, strips or lines.

Figure 2D:
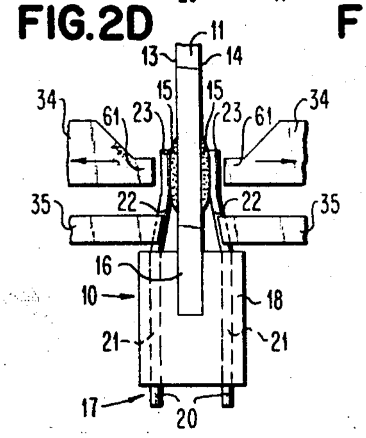

With the forming blades still in working position, the heating blades 34 are removed allowing the solder to solidify while the joint formed is held immobile (FIG. 2D).

Figure 2E:
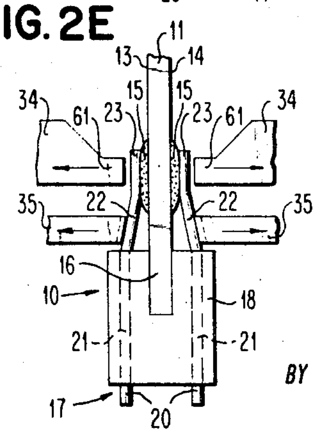

In the final operation (FIG. 2E), the forming blades 35 are retracted and the clamping bar 43 is relieved. This completes simultaneous bonding of all pins to both sides of the board. The stressing of the pin against the strip while the solder is still molten by a separate member gives rise to a mechanically stronger joint and eliminates dependency upon the tensile strength of the solder as a means of holding the terminal pins to the circuit strips. The stressing of the pins eliminates a cantilever spring back.

While the invention has been particularly shown and described with reference to the preferred embodiment thereof, it will be understood by those skilled in the art that various changes in form and detail may be made therein without departing from the spirit and scope of the invention.

What is claimed is:

1. The method for simultaneously bonding surfaces of two rows of spaced terminal pins projecting from an adapter plug to surfaces of rows of a like number of spaced strips on both faces of a dielectric card inserted therebetween, the surfaces of an associated pin and strip forming a set, at least one surface of each set being coated with a low melting point material comprising:
- bringing the surfaces together;
- applying heat to melt the low melting point material;
- stressing the pin surfaces inwardly against the strip surfaces while the low melting point material is still soft; and
- removing the heat while the pin surfaces are still being held against the strip surfaces.

2. The method according to claim 1 including registering the pins with their respective strips while the pin surfaces are stressed against the strip surfaces and the low melting point material is still molten.

References Cited

UNITED STATES PATENTS

| | | | |
|---|---|---|---|
| 2,538,495 | 1/1951 | Barry | 29—497 XR |
| 2,710,901 | 6/1955 | Ireland | 219—10.41 XR |
| 2,852,755 | 9/1958 | Martines | 29—630 XR |
| 2,963,392 | 12/1960 | Dahlgren | 29—488 XR |
| 3,230,338 | 1/1966 | Kawecki | 219—161 XR |
| 3,353,263 | 11/1967 | Helms | 29—471.1 XR |
| 3,389,457 | 6/1968 | Goldman et al. | 29—471.1 XR |

JOHN F. CAMPBELL, Primary Examiner
RICHARD BERNARD LAZARUS, Assistant Examiner

U.S. Cl. X.R.

29—493, 497.5, 502, 628